(12) United States Patent
Knowlton et al.

(10) Patent No.: US 8,935,557 B2
(45) Date of Patent: Jan. 13, 2015

(54) PORT POWER SWITCH BASED LEAD COMPENSATION

(75) Inventors: Timothy J. Knowlton, Benson, AZ (US); Miroslav Oljaca, Tucson, AZ (US)

(73) Assignee: SMSC Holdings S.a.r.l., Luxembourg (LU)

( * ) Notice: Subject to any disclaimer, the term of this patent is extended or adjusted under 35 U.S.C. 154(b) by 390 days.

(21) Appl. No.: 13/407,153

(22) Filed: Feb. 28, 2012

(65) Prior Publication Data

US 2013/0227307 A1 Aug. 29, 2013

(51) Int. Cl.
*G06F 1/26* (2006.01)

(52) U.S. Cl.
CPC ............... *G06F 1/266* (2013.01); *G06F 1/263* (2013.01)
USPC ............................ 713/340; 713/300; 713/310

(58) Field of Classification Search
CPC ..... G06F 1/263; G06F 1/266; Y02B 60/1278; Y02B 60/1282; Y02B 60/1285
USPC ......................................... 713/300, 310, 340
IPC .................. G06F 1/263, 1/266; Y02B 60/1278, Y02B 60/1282, 60/1285
See application file for complete search history.

(56) References Cited

U.S. PATENT DOCUMENTS

| | | | |
|---|---|---|---|
| 4,157,512 A | 6/1979 | Schmoock | |
| 4,635,057 A | 1/1987 | Schaefer | |
| 5,514,947 A | 5/1996 | Berg | |
| 5,664,204 A | 9/1997 | Wang | |
| 6,344,985 B1 | 2/2002 | Akerson | |
| 6,522,515 B1 | 2/2003 | Whitney | |
| 7,781,908 B2 | 8/2010 | DuBose et al. | |
| 8,055,919 B2 | 11/2011 | Magnusson | |
| 8,084,987 B2 | 12/2011 | Hurtz | |
| 8,266,456 B2 * | 9/2012 | Chang et al. | 713/300 |
| 2006/0097572 A1 * | 5/2006 | Drouin et al. | 307/1 |
| 2011/0096574 A1 * | 4/2011 | Huang | 363/21.18 |

OTHER PUBLICATIONS

TE Connectivity, "PolySwitch Resettable Devices," Tyco Electronics Corporation, 2012, 2 pages.
Texas Instruments, "USB Charging Port Power Switch and Controller: TPS2540, TPS2540A, TPS2541, TPS2541A," SLVSAG2C Oct. 2010—revised Oct. 2011, 39 pages.

* cited by examiner

*Primary Examiner* — Thuan Du
(74) *Attorney, Agent, or Firm* — King & Spalding L.L.P.

(57) ABSTRACT

A port power switch (PPS) may be used for lead compensation in systems where power is provided to a connected device by a switch-mode power supply (SMPS). The PPS may be designed to co-operate with the SMPS, providing a mechanism for the feedback reference point of the SMPS to be automatically switched, in the event of system fault or some other condition that might result in the PPS entering an "OFF" operating mode, from the application point of load (POL) to the voltage input pin of the PPS without loss of power path continuity. The switching mechanism and the PPS may be manufactured to reside on the same integrated circuit. The PPS may include a control block that generates a control signal to couple the feedback port of the SMPS to the POL under normal operation, and to the voltage input port of the PPS during a fault condition.

20 Claims, 6 Drawing Sheets

PORT POWER SWITCH BASED LEAD COMPENSATION

BACKGROUND OF THE INVENTION

1. Field of the Invention

The present invention relates generally to port power switches, and more specifically to methods of lead compensation that use port power switches.

2. Description of the Related Art

The Universal Serial Bus (USB) was developed to offer PC users an enhanced and easy-to-use interface for connecting an incredibly diverse range of peripherals to their computers. The development of the USB was initially driven by considerations for laptop computers, which greatly benefit from a small profile peripheral connector. Among the many benefits of the USB is a reduction in the proliferation of cables that can affect even the smallest computer installations. In general, USB has become the interface of choice for PCs because it offers users simple connectivity. USB eliminates the need to have different connectors for printers, keyboards, mice, and other peripherals, and supports a wide variety of data types, from slow mouse inputs to digitized audio and compressed video. In addition, USB devices are hot pluggable, i.e. they can be connected to or disconnected from a PC without requiring the PC to be powered off The USB specification has seen various revisions, with the USB 2.0 standard challenging the IEEE 1394 interface ("Firewire") as the interface of choice for high-speed digital video, among others. The USB 3.0 standard, representing the second major revision of the USB standard, specifies a maximum transmission speed of up to 5 Gbits/s (640 MBbytes/s), which is over 10 times faster than the maximum speed specified in the USB 2.0 standard (480 Mbits/s). The USB 3.0 standard also features reduced time required for data transmission, reduced power consumption, and is backward compatible with USB 2.0. A connection between the USB device and the host may be established via a four-wire interface that includes a power line, a ground line, and a pair of data lines D+ and D−.

The USB standard provides guidelines for the allowed common-mode voltage on the differential data lines (D+ and D−). Newer specifications also allow for battery charging using a USB port, which is oftentimes implemented through port power switches (PPS) incorporated in a USB host and/or hub. More commonly, traditional 'linear-type' PPSs utilized in USB and other DC power applications, e.g. in PCs and notebook computers, serve to provide or prevent power application to one or more attached electronic loads. These low cost protection devices are a commodity and have proliferated in the market.

USB ports typically each include one PPS, which serves to protect both the application (e.g. in a USB device) and electronic load from certain types of failure, such as electronic load short circuit or an application over-voltage. According to USB-IF specifications, a USB port is required to provide between 4.75V and 5.25V for non-dedicated charging ports configurations. Examples of electronic loads include USB portable devices such as cell phones attached via the applications USB connector, e.g. the Point of Load (POL). A typical primary DC power source in these applications is a Switch-Mode Power Supply (SMPS) that provides high efficiency voltage conversion from the internal higher voltage battery voltage to a lower voltage, such as 5V DC +/−5%, for both the internal system and one or more attached electronic loads.

Some electronic loads base their rate of charge on the voltage level present. For example, if 5.25V is present, charging could be at 2.0 amps. However, if the voltage present is 4.75V, charging current could drop down to 1.0 amp. This results in doubling the charging time and is undesirable. Since linear PPS devices contain a finite amount of 'ON' resistance during operation, increasing the electronic load current will cause a corresponding increase in voltage drop across it (according to Ohm's law). Furthermore, circuit board resistance can further increase this voltage drop. Portable devices with larger batteries require more charging current in order to charge within a reasonable amount of time, thus requiring the SMPS voltage output to be set to a higher voltage level to compensate for any expected application voltage drops under load. Unfortunately, when no load is present, this voltage could exceed the USB-IF limit of 5.25V.

Since SMPS applications depend on voltage feedback in order to maintain their voltage output under varying load conditions, the ideal point to monitor is the POL. However, this is problematic when the PPS enters a fault condition and shuts 'OFF' as the POL voltage reaches 0V in most cases. This causes the SMPS to attempt to increase its voltage and enter a fault state. Accordingly, SMPS feedback reference points are either at their voltage output pin or at the input to the PPS switch, which does provide some compensation for the printed circuit board (PCB) resistance from the SMPS to the PPS. However, the PPS "ON' resistance and trace resistance from the PPS voltage output to the POL is not compensated.

Other corresponding issues related to the prior art will become apparent to one skilled in the art after comparing such prior art with the present invention as described herein.

SUMMARY OF THE INVENTION

A power point switch (PPS), typically used to control power output in Universal Serial Bus applications, may be used for lead compensation in systems where power is provided to a device or devices by a controlled power supply or power supplies, e.g. one or more feedback controlled switchmode power supplies (SMPS). The PPS may be designed to work with the SMPS, and provide a mechanism to have the feedback reference point of the SMPS coupled to a valid reference voltage, even when a fault condition occurs. In some embodiments, the PPS may operate to switch, in the event of system fault or some other condition that might result in the PPS entering an "OFF" operating mode, the feedback port of the SMPS from the application point of load (POL) to the voltage input pin of the PPS without loss of power path continuity. The switching mechanism and the PPS may be manufactured to reside on the same integrated circuit, which may include a control block generating a control signal to control connectivity of the feedback port of the SMPS. The control signal may operate a switch to couple the feedback port of the SMPS to the POL under normal operation, and to the voltage input port of the PPS when a fault condition occurs. The control signal may operate the switch as a make-before-break switch, ensuring that connectivity in the feedback path remains uninterrupted.

In one set of embodiments, a system may include a power supply that generates a supply voltage, which the power supply regulates according to a feedback voltage that the power supply receives at a feedback port. The system may also include a device coupled to a POL, and intended to be powered by the supply voltage. The system may also include a PPS that receives an input supply voltage derived from the supply voltage generated by the power supply, provides an output supply voltage based on the input supply voltage, to power the device, receives from the POL a POL voltage derived from the output supply voltage, and provides a feedback voltage from a PPS output port to the feedback port of the power supply. To provide the appropriate feedback voltage, the PPS may switchably apply the POL voltage and the input supply voltage to the PPS output port according to operating conditions of the PPS. For example, under normal operating conditions, the PPS may couple the POL voltage to the output port, while during a fault condition, e.g. an over-current condition, the PPS may couple the input supply voltage to the output port.

In order to switchably apply the POL voltage and the input supply voltage to the PPS output port, the PPS may generate a control signal that operates a switching element to switch the POL voltage to the PPS output port and cut off the input supply voltage from the PPS output port under normal operating conditions, and switch the input supply voltage to the PPS output port and cut off the POL voltage from the PPS output port when a fault condition occurs. The PPS may enter an "OFF" state in response to the fault condition, which may activate the control signal to switch from the POL voltage to the input supply voltage at the output port. In some embodiments the PPS is configured on an integrated circuit that also includes the control logic/circuitry and switching mechanism that performs switching between the POL voltage and the input supply voltage at the output port. In order to continually provide a feedback voltage, the PPS may also maintain the POL voltage at the PPS output port until the input supply voltage is applied to the PPS output port when switching from the POL voltage at the PPS output port to the input supply voltage at the PPS output port, and/or maintain the input supply voltage at the PPS output port until the POL voltage is applied to the PPS output port when switching from the input supply voltage at the PPS output port to the POL voltage at the PPS output port. In some embodiments the power supply may be a switch-mode power supply.

BRIEF DESCRIPTION OF THE DRAWINGS

A better understanding of the present invention may be obtained when the following detailed description is considered in conjunction with the following drawings, in which.

Figure 1:
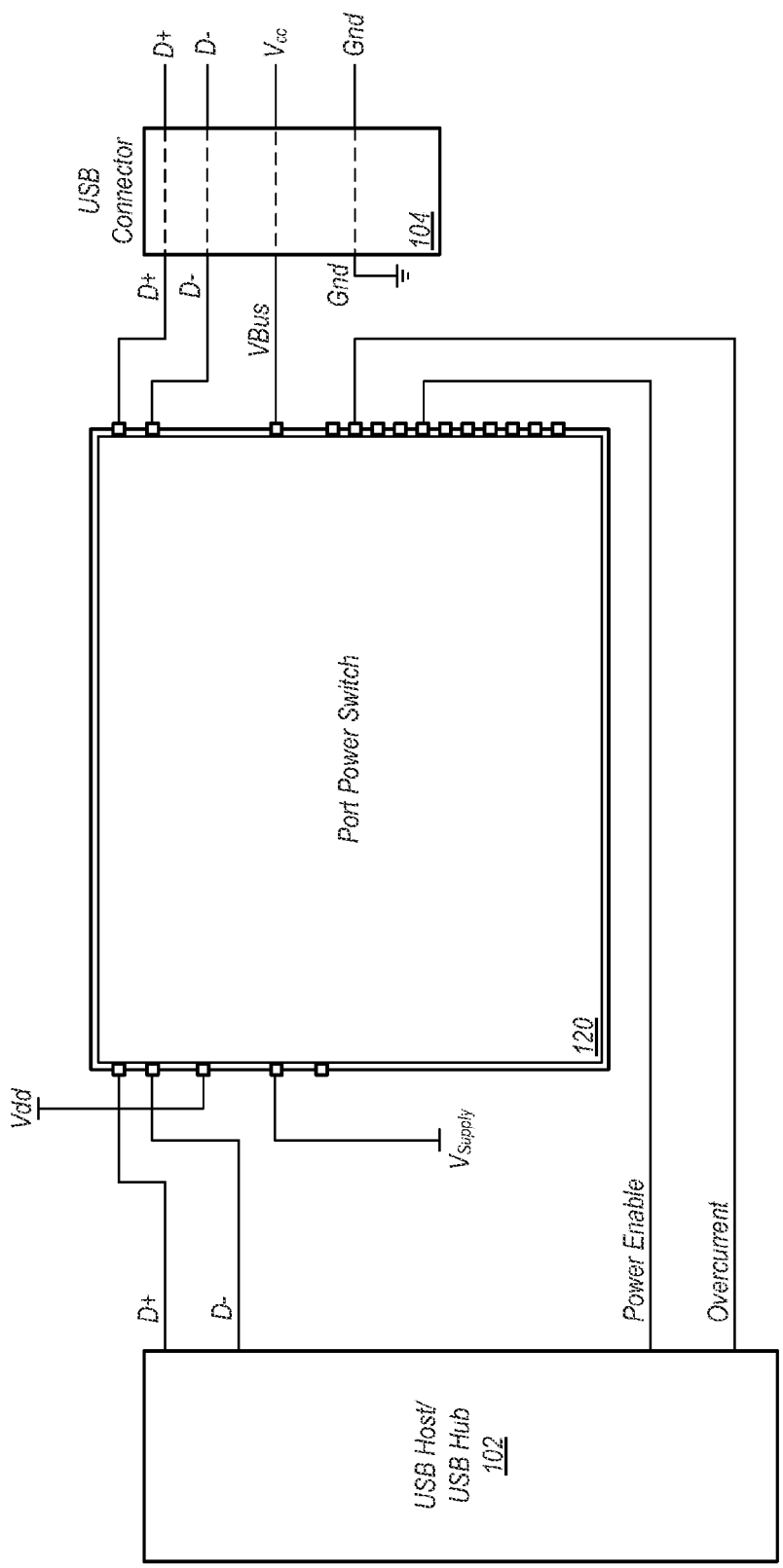
FIG. 1 shows one embodiment of a USB system that includes a port power switch.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (e.g., having the potential to or being able to in some embodiments), not a mandatory sense (i.e., must). The term "include", and derivations thereof, mean "including, but not limited to". The term "coupled" means "directly or indirectly connected".

DETAILED DESCRIPTION OF THE PREFERRED EMBODIMENTS

FIG. 1 illustrates one embodiment of an exemplary USB system that uses a port power controller/switch (PPS) 120 coupled between a USB Host/USB Hub 102 and a USB connector 104, which may be part of a USB device or another USB Hub (not shown). Alternatively, in some embodiments PPS 120 may be part of a USB host (e.g. a part of USB Host 102), in which case USB connector 204 may represent the USB output of the USB host (i.e., the output of USB host 102). While PPS 120 is shown here as part of a USB system, in alternative embodiments, PPS 120 may be included in other DC power applications as well, with some input/output pins of PPS 120 possibly differing from those shown in FIG. 1.

Among other things, PPS 120 may serve to protect both USB host 102 and any electronic load/application coupled to USB connector 104 (e.g. USB portable devices such as cell phones, connector 104 corresponding to the Point of Load—POL) from certain types of failure, such as electronic load short circuit or an application over-voltage. However, most present day applications do not utilize low cost PPS devices in the power path, instead implementing more expensive POL Switch-Mode Power Supply (SMPS) solutions, or resettable fuses that offer much more limited protection (e.g. over-current) than a PPS provide. One example of a POL SMPS solution is the Texas Instrument TPS2500, and example of resettable fuses are Polyswitches™, from TE Connectivity.

Figure 2:
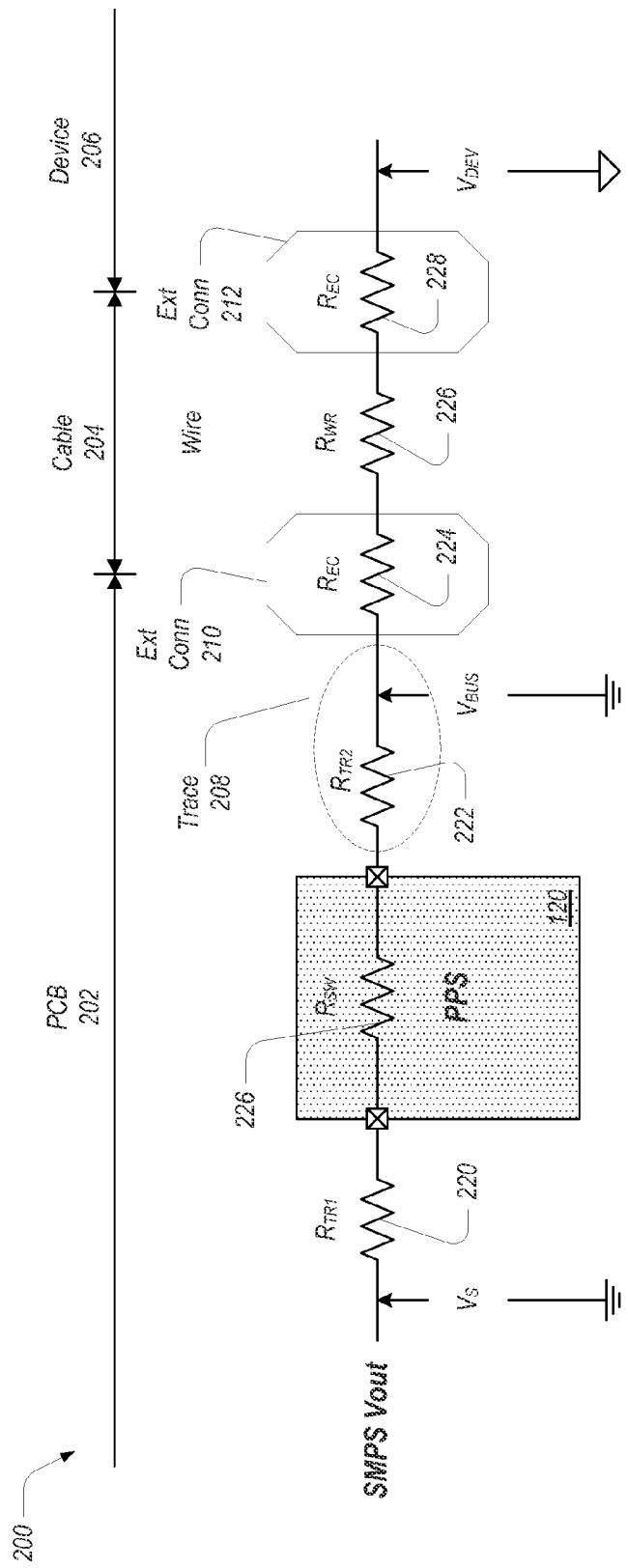
FIG. 2 shows a circuit diagram illustrating the connectivity of various resistances and voltages for a port power switch configured on a printed circuit board and coupling to a device through a cable, according to one embodiment.
Figure 3:
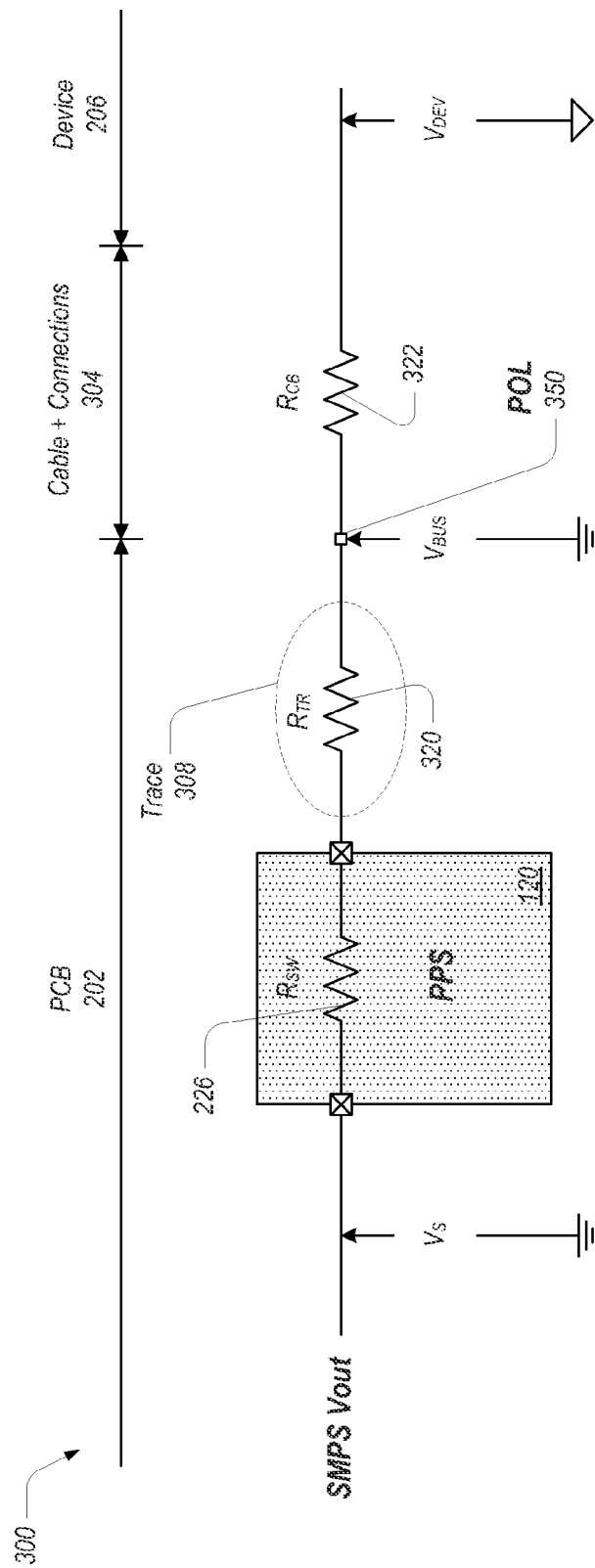
FIG. 3 shows a simplified circuit diagram of the circuit diagram shown in FIG. 2, according to one embodiment.

In one set of embodiments, PPS 120 may also be used for lead compensation, as will be further discussed below. PPS 120 may be designed to operate with an SMPS, providing a mechanism for the feedback reference point of the SMPS to be automatically switched, in the event of system fault or some other PPS "OFF" operating mode, from the application POL to the voltage input pin of PPS 120, without loss of power path continuity. FIG. 2 shows a simplified circuit diagram 200 illustrating the connectivity of various resistances (e.g. various trace and lead resistances) and voltages for a PPS 120 configured on a printed circuit board (PCB) 202, and coupling to a device 206 through cable 204. As shown in FIG. 2, trace resistance from the output of the SMPS to the input of PPS 120 is represent by resistor 220, the internal overall resistance within PPS 120 is represented by resistor 226, the trace resistance from the output of PPS 120 to external connector 210 is represented by resistance 222, the resistance of connector 210 is represented by resistor 224, the resistance of cable 204 is represented by resistor 226, and the resistance of connector 212 connecting to device 206 is represented by resistor 228. An even more simplified circuit diagram 300 of circuit diagram 200 is shown in FIG. 3, in which all trace resistance has been lumped into a single resistance represented by resistor 320, and cable 204 and connectors 210 and 212 are considered as representative of a single resistance represented by resistor 322. The point of load (POL) where the device 206 connects is at node 350. The total voltage drop from SMPS Vout to POL may then be expressed as $I_{DEV} \times$ ($R_{SW}+R_{TR}$), where $I_{DEV}$ is the current flowing from SMPS through PPS 120 through device 206. $R_{CB}$ 322 is generally an uncontrollable variable as it is electronic load specific (or can vary per cable/connector implementation). $V_{DEV}$ is the voltage at the electronic load (device 206) electrical connector (e.g. connector 212 in FIG. 2). If the device 206 is attached directly to the POL 350, then $V_{BUS}=V_{DEV}$.

Figure 4:
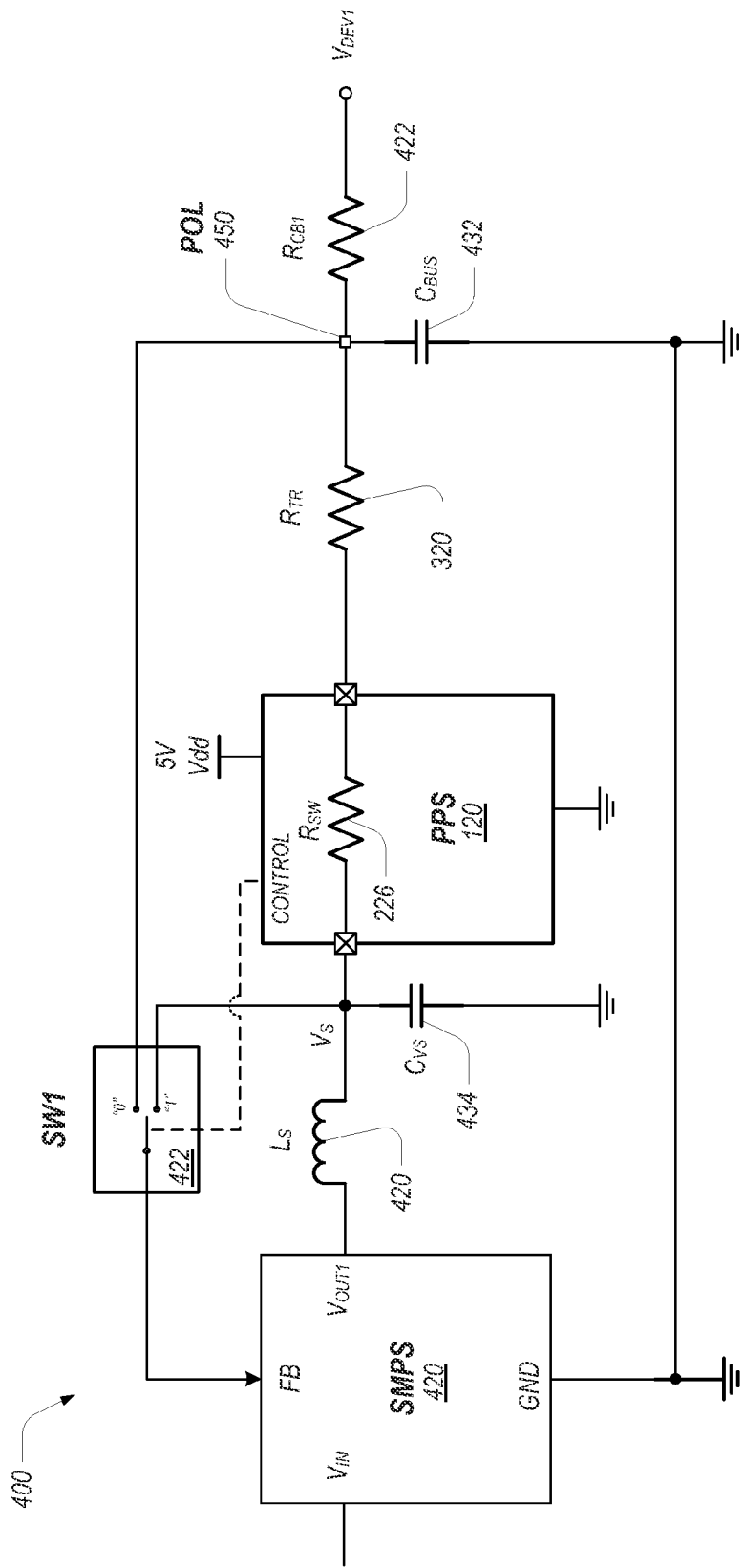
FIG. 4 shows a circuit diagram of a system in which a port power switch is used to manage the feedback reference voltage provided to a switch-mode power supply, according to one embodiment.

FIG. 4 shows a partial circuit diagram of a system 400 in which some form of control provided by PPS 120 (here denoted by the discrete signal output, CONTROL), the SMPS feedback may be switched between the input $V_S$ of PPS 120 and the POL 450, where a device (e.g. device 206) may be coupled. In system 400, the output voltage $V_{OUT1}$ provided by SMPS 420 may be coupled via an output filter stage that includes inductor 420 and capacitor 434 to the voltage input of PPS 120. A collective trace resistance (or lead resistance) between the POL 450 where the device may be coupled is represented here by resistor 320. As shown in FIG. 4, using a control signal, PPS 120 may operate to switch, using switch 422, the feedback voltage to SMPS 420 between the voltage developed at POL 450 and the voltage $V_S$ developed at the input of PPS 120. The collective resistance of cables and connectors connecting the device to the PCB on which SMPS 420 and PPS 120 may be configured is represented by resistor 320, with a bus capacitance represented by capacitor 432. For example, under normal operating conditions when PPS 120 is in an 'On' state, switch 422 may be held in the '0" position via the CONTROL signal by PPS 120. When, for example, an over-current condition occurs, PPS 120 may enter an 'Off' state, the resistance of $R_{SW}$ 226 thereby effectively increasing to potentially many MΩ (mega ohms). In response to this condition, PPS 120 may operate to flip switch 422 over to the "1" position, thus maintaining the voltage reference for SMPS 420 at a desirable value. The topology of system 400, while functionally advantageous, may present difficulties in PCB realizations, due primarily to noise sensitivity issues.

Figure 5:
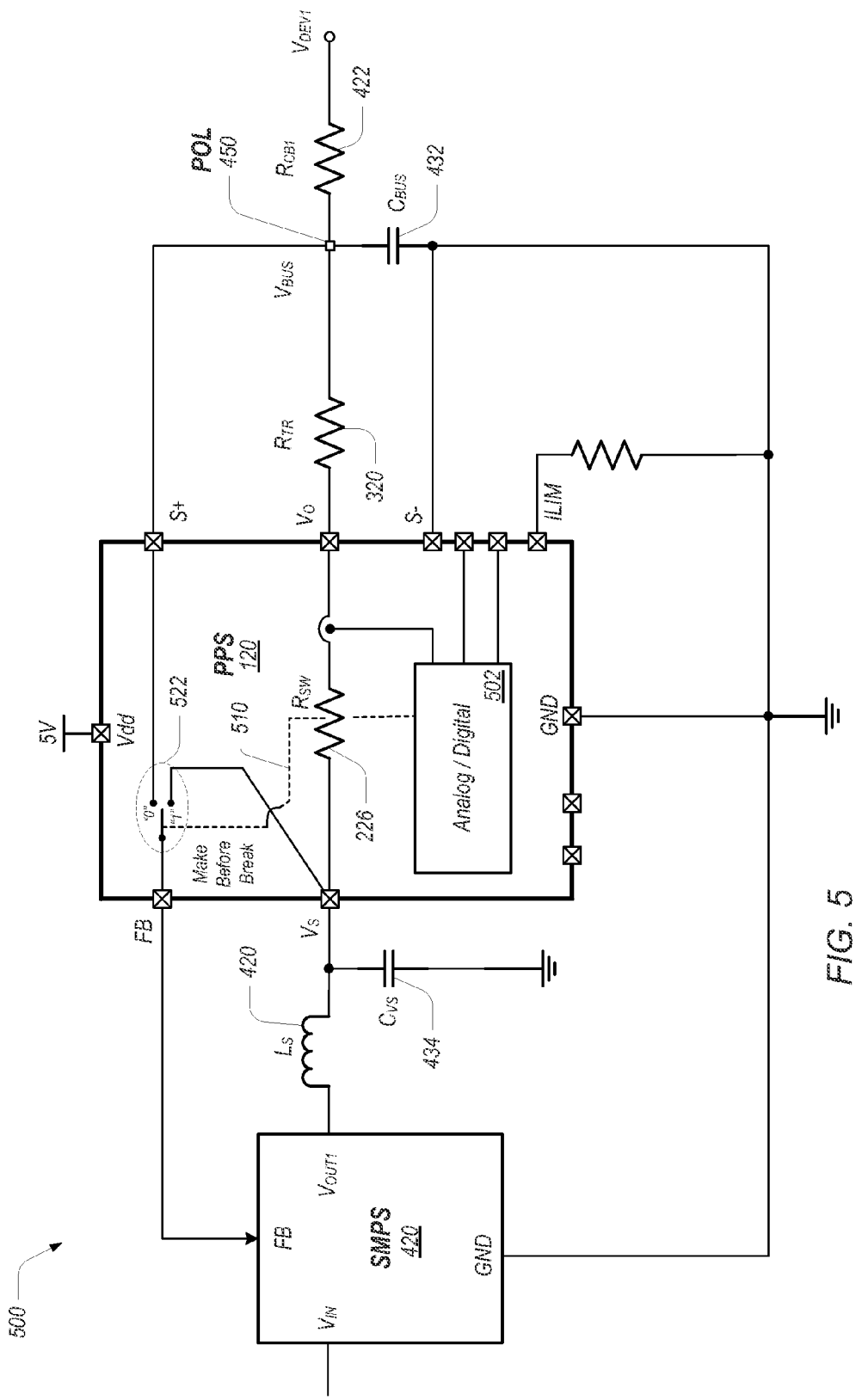
FIG. 5 shows a circuit diagram of one embodiment of an Integrated Circuit implementation of the system shown in FIG. 4.

FIG. 5 shows the partial circuit diagram of a system 500 implementing the concept illustrated by system 400 in FIG. 4, but with switch 422 contained within an Integrated Circuit (IC). As shown in FIG. 5, switch 422 is implemented as switch 522. In other words, switch 522 and PPS 120 are configured on the same IC, or switch 522 may be configured as part of PPS 120 on a single IC. In this fashion, switching may be seamless, timing optimized, environmental noise effects eliminated, and even realized with high volume manufacturing methods. In order to ensure desired operation, switch 522 may be designed to operate as a "make before break" switch when switching the feedback reference point. That is, analog/digital logic block 502 may generate control signal 510 to establish a connection to one of the positions ("1" and "0") before breaking off the connection from the other position. For example, when PPS 120 is operating normally, and switch 522 is in the "0" position when a fault condition occurs, logic block 502 may operate to couple feedback point FB to the "1" position before disengaging switch 522 from the "0" position. If switch 522 were not operated in this manner, a discontinuity may occur and disrupt other subsystems that may be relying on the output voltage $V_S$ of SMPS 420. It should be noted that connectivity of the various components as well as SMPS 420 to PPS 120 is shown for illustrative purposes, and other PPS modules may include other and/or different internal components and pins that may be used to establish the same overall functionality as shown in FIGS. 4 and 5.

It should also be noted that the switching solutions exemplified in FIGS. 4 and 5 are not realizable by using SMPS only, because they do not externally provide the necessary information of the primary power FET state in time to reliably control an external feedback point switch. Even if such information were provided, environmental noise issues may make it difficult (if not impossible) to implement the system on a PCB. Systems 400 and 500 differ from pure SMPS port power control methods by allowing an external reference point to be utilized for feedback to the application SMPS. By utilizing a traditional PPS, cost may also be reduced, partly due to requiring lower voltage IC processes than an SMPS-only approach might afford. Systems 400 and 500 also differ from resettable fuse techniques, which provide no information that could be used to control shifting of a reference point. Should an over-current condition event occur, resettable fuses may take many minutes to fully recover, allowing the fuse resistance to return to its proper operating (i.e. non-fault) value.

Figure 6:
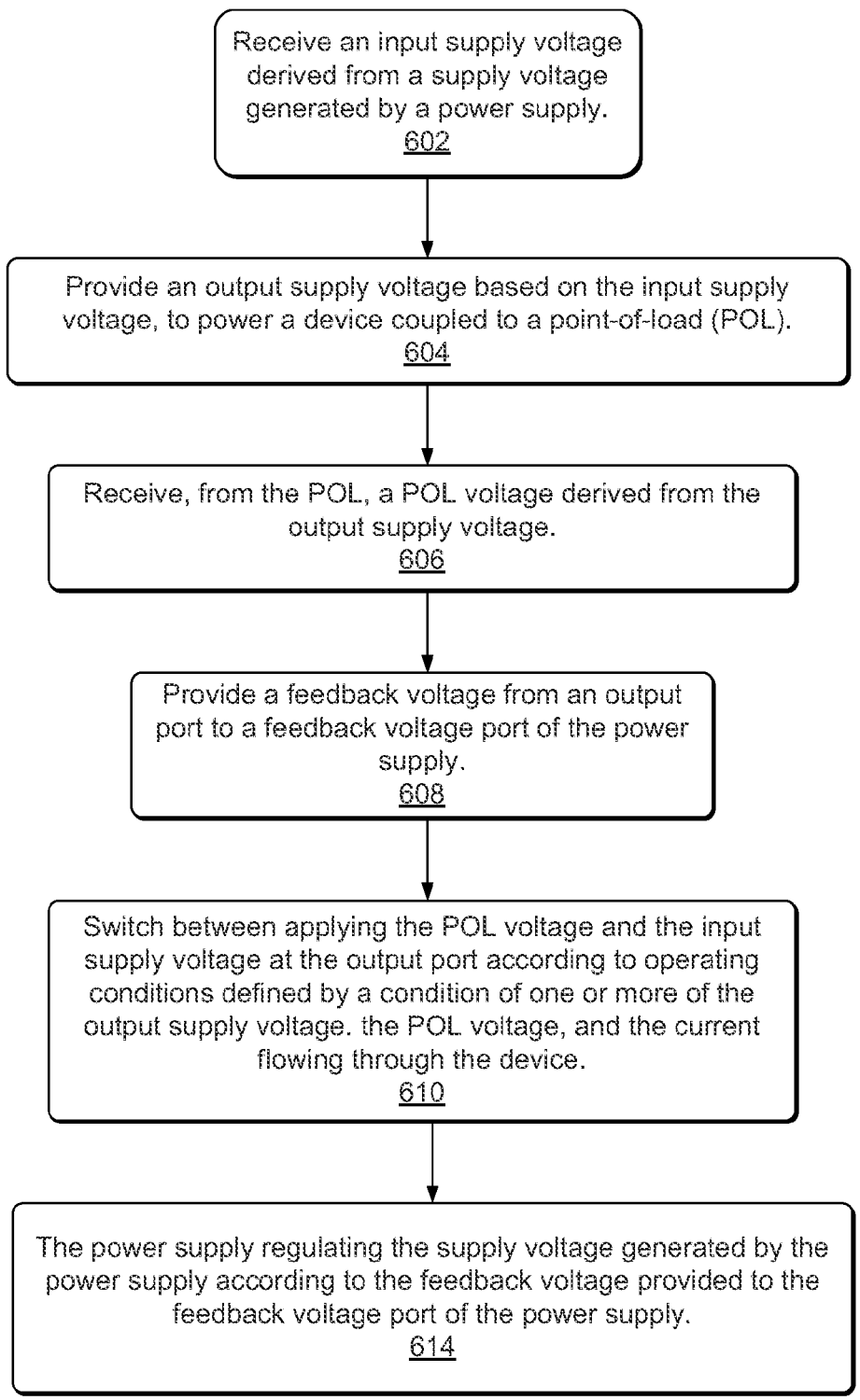
FIG. 6 shows a flow diagram of one embodiment of a method to provide a reference feedback voltage to a power supply.

FIG. 6 shows a flow diagram of one embodiment of a method of providing a reference feedback voltage to a power supply, e.g. an SMPS, using a PPS. According to the embodiment shown in FIG. 6, the method includes receiving an input supply voltage derived from a supply voltage generated by the power supply (602), and providing an output supply voltage based on the input supply voltage, to power a device coupled to a POL (604). The method may further include receiving, from the POL, a POL voltage derived from the output supply voltage (606), providing a feedback voltage from an output port to a feedback voltage port of the power supply (608), and switching between applying the POL voltage and the input supply voltage at the output port according to operating conditions, which may be defined by a condition of one or more of the output supply voltage, the POL voltage, and the current flowing through the device, or by other specified conditions, e.g. fault conditions (610). The power supply may then regulate its generated supply voltage according to the feedback voltage provided to the feedback voltage port of the power supply (614). In some embodiment, a PPS may be used to perform steps 602-610. The PPS may include control circuitry to control an internal switch configured on the same integrated circuit, to switch between providing the POL voltage and the input supply voltage at the output port. Specifically, the switch may be operated to provide the POL voltage during normal operating conditions, and to provide the input supply voltage when encountering a fault condition, which may include over-current or over-voltage conditions that may cause the PPS to enter an OFF-state.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims. For example, while the specific embodiments provided herein focus on the established USB standard, other embodiments may equally be designed to be implemented with other standards.

We claim:

1. A port power switch (PPS) comprising:
   a first input port configured to receive an input supply voltage derived from a supply voltage generated by a power supply;
   a first output port configured to provide an output supply voltage based on the input supply voltage, to power a device coupled to a point-of-load (POL);
   a second input port configured to receive, from the POL, a POL voltage derived from the output supply voltage;
   a second output port configured to provide a feedback voltage to a feedback port of the power supply wherein the feedback voltage is used by the power supply to regulate the supply voltage generated by the power supply; and
   a control block configured to switch the feedback voltage provided via the second output port between the first input port and the second input port wherein the control block makes switching determination based on operating conditions of the PPS.

2. The PPS of claim 1, further comprising a switching element, wherein the control block is configured to generate a control signal to operate the switching element to:
   connect the second input port to the second output port, and disconnect the first input port from the second output port under normal operating conditions; and
   connect the first input port to the second output port, and disconnect the second input port from the second output port when a fault condition occurs.

3. The PPS of claim 2, wherein the PPS is configured to enter an "OFF" state in response to the fault condition.

4. The PPS of claim 2, wherein the PPS is configured on an integrated circuit.

5. The PPS of claim 1, wherein the control block is configured to maintain connectivity of the second output port to the first input port until the second output port is coupled to the second input port when switching connectivity of the second output port from the first input port to the second input port.

6. The PPS of claim 1, wherein the control block is configured to maintain connectivity of the second output port to the second input port until the second output port is coupled to the first input port when switching connectivity of the second output port from the second input port to the first input port.

7. A system comprising:
   a power supply configured to generate a supply voltage, wherein the power supply has a feedback port to receive a feedback voltage wherein the feedback voltage is used by the power supply to regulate the supply voltage generated by the power supply;
   a point-of-load (POL);
   a device coupled to the POL; and
   a port power switch (PPS) configured to:
      receive an input supply voltage derived from the supply voltage generated by the power supply;
      provide an output supply voltage based on the input supply voltage, to power the device;
      receive, from the POL, a POL voltage derived from the output supply voltage;
      provide a feedback voltage from a PPS output port to the feedback port of the power supply; and
      switch the feedback voltage provided via the PPS output port between the POL voltage and the input supply voltage wherein a control block of the PPS is configured to determine when to switch between the POL voltage and the input supply voltage based on operating conditions of the PPS.

8. The system of claim 7, wherein in switchably applying the POL voltage and the input supply voltage to the PPS output port, the PPS is configured to:
   generate a control signal to operate a switching element to:
      switch the POL voltage to the PPS output port, and cut off the input supply voltage from the PPS output port under normal operating conditions; and
      switch the input supply voltage to the PPS output port, and cut off the POL voltage from the PPS output port when a fault condition occurs.

9. The system of claim 8, wherein the PPS is configured to enter an "OFF" state in response to the fault condition.

10. The system of claim 7, wherein the PPS is configured on an integrated circuit.

11. The system of claim 7, wherein the PPS is configured to perform one or more of:
   maintain the POL voltage at the PPS output port until the input supply voltage is applied to the PPS output port when switching from applying the POL voltage at the PPS output port to applying the input supply voltage at the PPS output port; or
   maintain the input supply voltage at the PPS output port until the POL voltage is applied to the PPS output port when switching from applying the input supply voltage at the PPS output port to applying the POL voltage at the PPS output port.

12. The system of claim 7, wherein the power supply is a switch-mode power supply.

13. A method for providing a feedback voltage to a power supply, the method comprising:
   receiving an input supply voltage derived from a supply voltage generated by the power supply;
   providing an output supply voltage based on the input supply voltage, to power a device coupled to a point-of-load (POL);
   receiving, from the POL, a POL voltage derived from the output supply voltage;
   providing a feedback voltage from an output port to a feedback voltage port of the power supply wherein the feedback voltage is used by the power supply to regulate the supply voltage generated by the power supply; and
   switch the feedback voltage provided via the output port between the POL voltage and the input supply voltage based on the operating conditions defined by a condition of one or more of the output supply voltage, the POL voltage, and a current flowing through the device.

14. The method of claim 13, wherein said switchably applying the POL voltage and the input supply voltage to the output port comprises:
   applying the POL voltage to the output port, and cutting off the input supply voltage from the output port under normal operating conditions; and
   applying the input supply voltage to the output port, and cutting off the POL voltage from the output port when a fault condition occurs.

15. The method of claim 14, further comprising:
   generating a control signal; wherein said applying the POL voltage to the output port, and cutting off the input supply voltage from the output port comprises using the control signal to operate a switching element to:
      decouple the output port from a terminal supplying the input supply voltage; and
      couple the output port to a terminal supplying the POL voltage; and
   wherein said applying the input supply voltage to the output port, and cutting off the POL voltage from the output port comprises using the control signal to operate the switching element to:
  decouple the output port from a terminal supplying the POL voltage; and
  couple the output port to a terminal supplying the input supply voltage.

16. The method of claim 13, wherein said switchably applying the POL voltage and the input supply voltage to the output port comprises one or more of:
  maintaining the POL voltage at the output port until the input supply voltage is applied to the output port when switching from applying the POL voltage at the output port to applying the input supply voltage at the output port; or
  maintaining the input supply voltage at the output port until the POL voltage is applied to the output port when switching from applying the input supply voltage at the output port to applying the POL voltage at the output port.

17. The method of claim 13, further comprising the power supply regulating the supply voltage generated by the power supply according to the feedback voltage provided to the feedback voltage port of the power supply.

18. A method for regulating a supply voltage, the method comprising:
  receiving a supply voltage from a power supply wherein the power supply receives a feedback voltage;
  a port power switch (PPS) receiving an input voltage derived from the supply voltage;
  the PPS generating an output voltage based on the input voltage;
  the PPS powering a device coupled to a point-of-load (POL) with the output voltage;
  receiving, by the PPS, a POL voltage; and
  switching the feedback voltage, by the PPSS, between the POL voltage and the input voltage wherein switching determinations are based on operating conditions of the PPS.

19. The method of claim 18, wherein the PPS switching between providing the POL voltage and the input voltage comprises:
  the PPS providing the feedback voltage at an output port;
  a control circuit within the PPS generating a control signal according to the operating conditions of the PPS; and
  the PPS toggling a switch that is configured to couple either the POL voltage or the input voltage to the output port, using the control signal.

20. The method of claim 19, wherein the PPS toggling the switch comprises the PPS always maintaining connectivity to a currently coupled one of the POL voltage and the input voltage at the output port before switching to the other one of the POL voltage and the input voltage, to continuously provide the feedback voltage to the power supply.

* * * * *